United States Patent
Peacos, III et al.

(10) Patent No.: US 10,562,636 B2
(45) Date of Patent: Feb. 18, 2020

(54) ENVIRONMENTAL CONTROL SYSTEM PACK WITH AN AIR SUPPLY MANIFOLD

(71) Applicant: Hamilton Sundstrand Corporation, Charlotte, NC (US)

(72) Inventors: Frederick Peacos, III, North Scituate, RI (US); Donald E. Army, Enfield, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 146 days.

(21) Appl. No.: 15/467,590

(22) Filed: Mar. 23, 2017

(65) Prior Publication Data

US 2018/0273186 A1  Sep. 27, 2018

(51) Int. Cl.
*B64D 13/06* (2006.01)
*F16L 9/19* (2006.01)
*F02C 9/18* (2006.01)
*B64D 13/00* (2006.01)

(52) U.S. Cl.
CPC ............ *B64D 13/06* (2013.01); *B64D 13/00* (2013.01); *F02C 9/18* (2013.01); *F16L 9/19* (2013.01); *B64D 2013/0618* (2013.01); *B64D 2013/0648* (2013.01)

(58) Field of Classification Search
CPC ............ B64D 13/06; B64D 2013/0618; B64D 2013/0648; F28D 7/10; F24F 2012/008; F16L 9/19; F02C 9/18
See application file for complete search history.

(56) References Cited

U.S. PATENT DOCUMENTS

| | | | | |
|---|---|---|---|---|
| 2,586,002 A | * | 2/1952 | Carson, Jr. ............ | B64D 13/06 55/459.1 |
| 2,628,482 A | * | 2/1953 | Burgess ................. | B64D 13/06 60/784 |
| 4,430,867 A | * | 2/1984 | Warner ................... | B60H 1/32 62/172 |

(Continued)

FOREIGN PATENT DOCUMENTS

| AT | 400889 B | 4/1996 |
|---|---|---|
| DE | 3310024 A1 | 9/1984 |
| DE | 3619157 A1 | 12/1987 |

OTHER PUBLICATIONS

Translation of AT400889.*
Extended European Search Report for EP Application No. 18162657.3, dated Aug. 14, 2018, 7 pages.

*Primary Examiner* — Christopher R Zerphey
(74) *Attorney, Agent, or Firm* — Kinney & Lange, P.A.

(57) ABSTRACT

An air supply manifold includes an outer duct, a first inner duct, and a second inner duct. The outer duct is configured to transfer a fluid from the outer duct inlet to the outer duct outlet and includes an outer duct inlet and an outer duct outlet. The first inner duct is disposed within and passes through the outer duct and includes a first inner duct inlet and a first inner duct outlet. The first inner duct inlet and outlet are disposed outside of the outer duct. The second inner duct includes a second inner duct outlet and inlet fluidly connected to the first inner duct. The second inner duct is disposed within the outer duct and branches off from the first inner duct. The second inner duct outlet is disposed outside of the outer duct.

21 Claims, 6 Drawing Sheets

(56) References Cited

U.S. PATENT DOCUMENTS

| | | | |
|---|---|---|---|
| 4,434,624 A * | 3/1984 | Cronin | B64D 13/06 |
| | | | 62/172 |
| 7,188,488 B2 | 3/2007 | Army, Jr. et al. | |
| 8,206,088 B1 * | 6/2012 | Plattner | B64D 13/06 |
| | | | 415/143 |
| 9,580,180 B2 * | 2/2017 | Jonqueres | B64D 13/08 |
| 9,764,435 B2 * | 9/2017 | Morris | F02C 7/10 |
| 2016/0047561 A1 | 2/2016 | Army, Jr. | |
| 2016/0231031 A1 | 8/2016 | Bruno | |
| 2017/0253343 A1 * | 9/2017 | Hara | B64D 33/04 |

\* cited by examiner

ENVIRONMENTAL CONTROL SYSTEM PACK WITH AN AIR SUPPLY MANIFOLD

BACKGROUND

The present disclosure relates to an environmental control system ("ECS") pack, and more particularly, to an air supply manifold for an ECS pack.

ECS packs are used in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the ECS pack before the air is delivered to the aircraft cabin.

An example of an ECS pack is disclosed in U.S. patent application Ser. No. 15/136,533 filed Apr. 22, 2016, entitled ENVIRONMENTAL CONTROL SYSTEM UTILIZING CABIN AIR TO DRIVE A POWER TURBINE OF AN AIR CYCLE MACHINE AND UTILIZING MULTIPLE MIX POINTS FOR RECIRCULATION AIR IN ACCORDANCE WITH PRESSURE MODE and published as U.S. Patent Application Publication No. 2016/0231031A1.

In aircraft, ECS packs typically utilize ducts independently spaced from each other to make various pneumatic supply connections throughout the ECS pack. Examples of ducts in ECS packs typically configured independently of each other include the fresh air inlet, bleed air inlet, outflow to the heat exchanger, air cycle machine ("ACM") compressor inlet, supply to the tip turbine fan, and others.

SUMMARY

An air supply manifold includes an outer duct, a first inner duct, and a second inner duct. The outer duct is configured to transfer a fluid from the outer duct inlet to the outer duct outlet and includes an outer duct inlet and an outer duct outlet. The first inner duct is disposed within and passes through the outer duct and includes a first inner duct inlet and a first inner duct outlet. The first inner duct inlet and outlet are disposed outside of the outer duct. The second inner duct includes a second inner duct outlet and inlet fluidly connected to the first inner duct. The second inner duct is disposed within the outer duct and branches off from the first inner duct. The second inner duct outlet is disposed outside of the outer duct.

An environmental control system pack includes an air supply manifold, an outflow heat exchanger, an air cycle machine compressor inlet, a tip turbine fan, a bleed air source, and a fresh air source. The air supply manifold includes an outer duct, a first inner duct, a second inner duct, and a set of support vanes. The outer duct is configured to transfer a fluid from the outer duct inlet to the outer duct outlet and includes an outer duct inlet and an outer duct outlet. The first inner duct is disposed within the outer duct and includes a first inner duct inlet and a first inner duct outlet. The second inner duct includes a second inner duct outlet and a second inner duct inlet fluidly connected to the first inner duct. The second inner duct is disposed within the outer duct and branches off from the first inner duct. The set of support vanes is connected to and extends outward from at least one of the first inner duct and the second inner duct. The outflow heat exchanger is fluidly connected to the first inner duct outlet. The air cycle machine compressor inlet is fluidly connected to the outer duct outlet. The tip turbine fan is fluidly connected to the second inner duct outlet. The bleed air source is fluidly connected to the first inner duct inlet. The fresh air source is fluidly connected to the outer duct inlet.

An environmental control system pack includes an outflow heat exchanger, an air cycle machine compressor inlet, a tip turbine fan, a bleed air source, a fresh air source, and an air supply manifold. The air supply manifold includes an outer duct, a first internal duct, and a second internal duct. The outer duct includes an outer duct outlet and a fresh air inlet fluidly connected to the fresh air source. The outer duct defines an outer flow path configured to supply fresh air to the air cycle machine compressor inlet. The first internal duct includes a first internal duct outlet and a first internal duct inlet fluidly connected to the bleed air source. The first internal duct is disposed within the outer duct. The first internal duct outlet defines a first internal flow path configured to supply air to the outflow heat exchanger. The first internal duct inlet and the first internal duct outlet are disposed outside of the outer duct. The second internal duct includes a second internal duct outlet and a second internal duct inlet fluidly connected to the first internal duct. The second internal duct is disposed within the outer duct and branches off from the first internal duct. The second internal duct defines a second internal flow path configured to supply air to the tip turbine fan. The second inner duct inlet is disposed within the outer duct and the second inner duct outlet is disposed outside of the outer duct.

DETAILED DESCRIPTION

An air supply manifold for an environmental control system ("ECS") pack provides a concentric duct design that enables a bleed air supply, a compressor fresh air supply, and a tip turbine fan supply to occupy minimum spatial volume. A bleed air duct passes through a portion of the air supply manifold with a tip turbine outflow duct (also positioned in the air supply manifold) extending from the bleed air duct. The air supply manifold also includes support vanes for structural support of an internal bleed air duct, thermal energy transfer from the bleed air duct to fresh air passing through the air supply manifold, and flow straightening between the bleed air duct flow and the annular fresh air flow. This efficient packaging approach reduces the over-all volume of the ECS pack enabling the ECS pack to fit within the same dimensional envelopes of lower capacity ECS packs.

Figure 1:
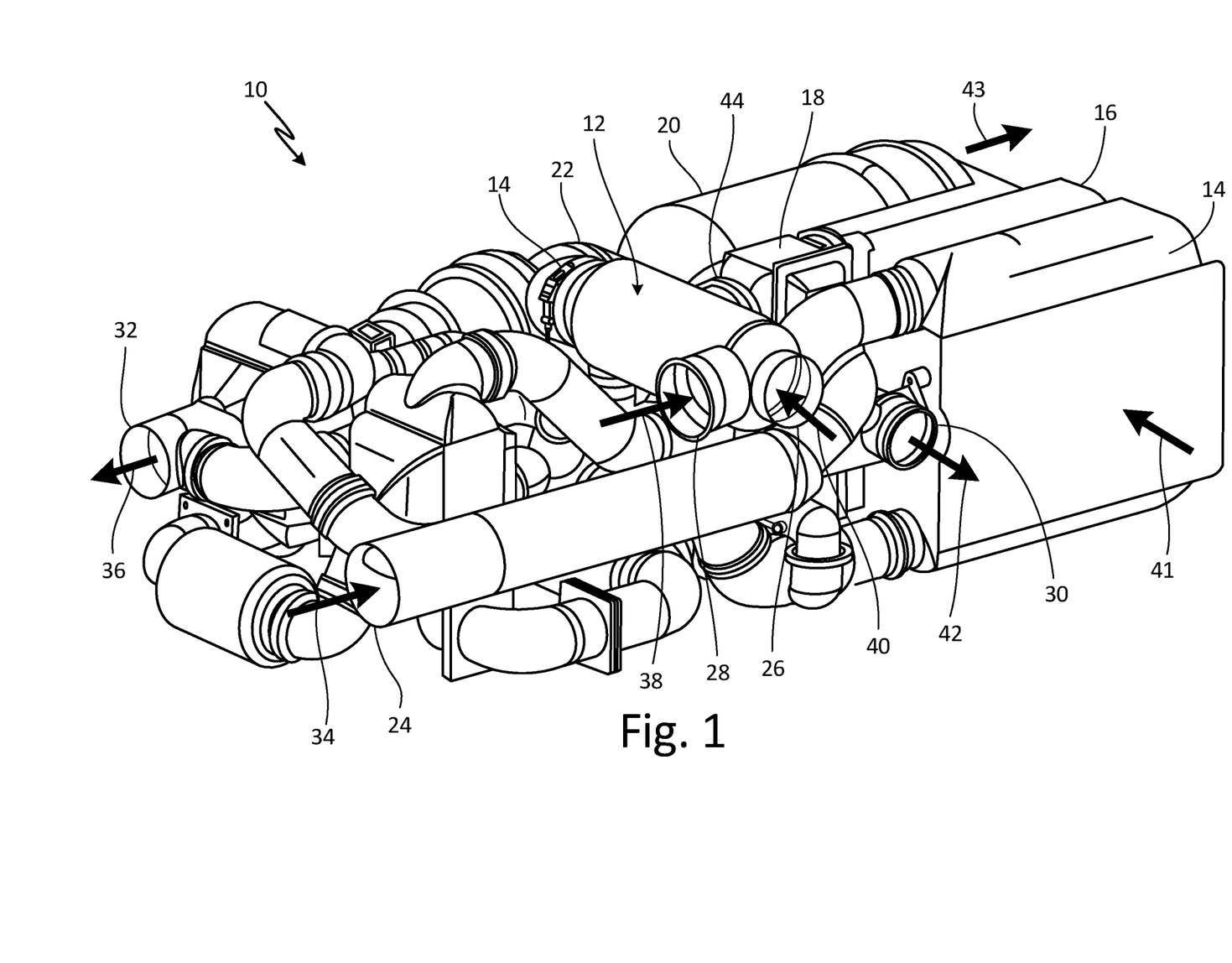
FIG. 1 is a perspective view of an ECS pack.
Figure 2:
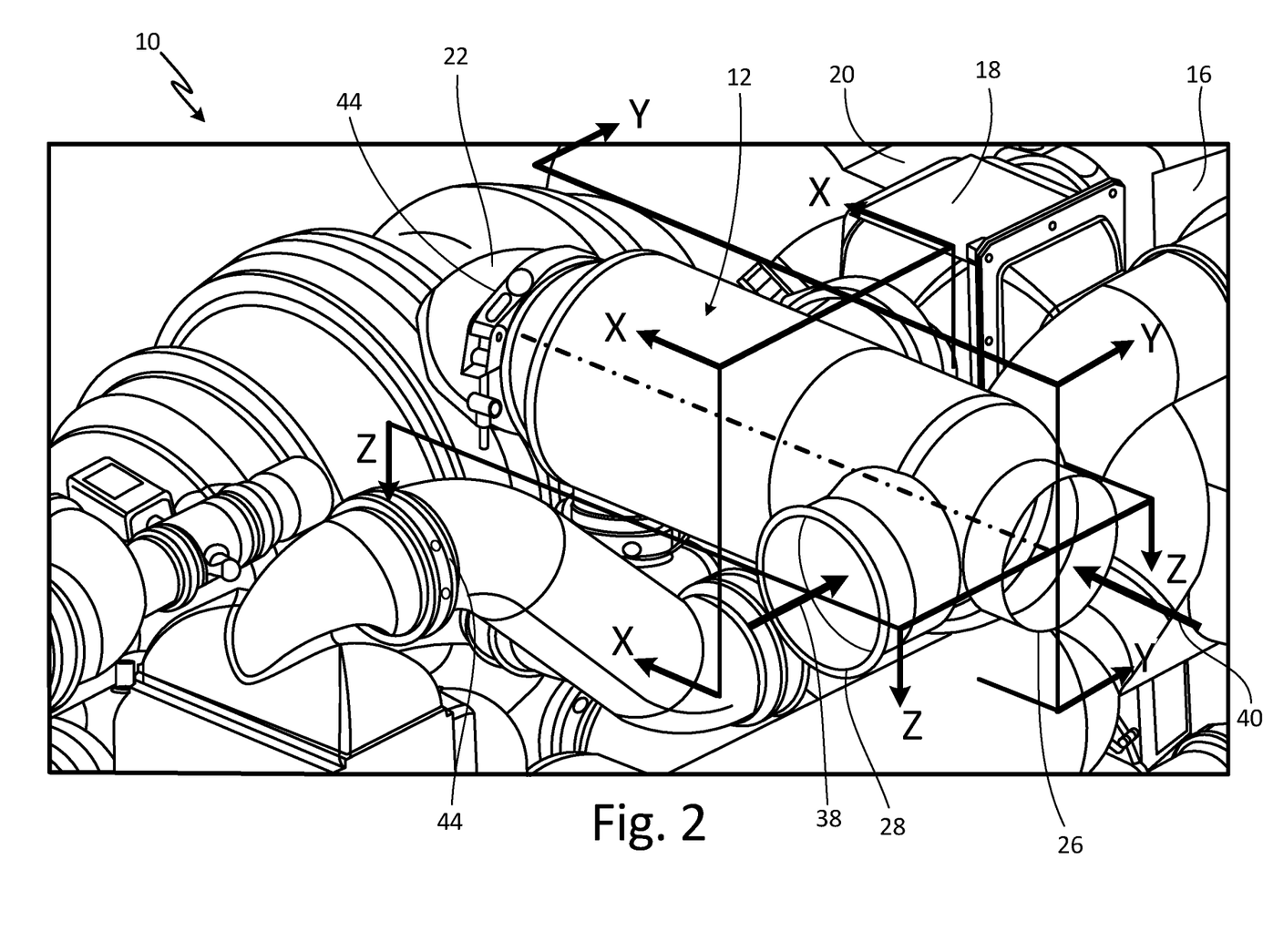
FIG. 2 is an enlarged perspective view of a portion of the ECS pack with an air supply manifold.

FIG. 1 shows a perspective view of ECS pack 10 with air supply manifold 12, fresh air heat exchanger 14, bleed air heat exchanger 16, outflow heat exchanger 18, ram air fan inlet housing 20, air cycle machine ("ACM") compressor inlet 22, cabin air inlet 24, fresh air inlet 26, bleed air inlet 28, power turbine outlet 30, cabin air outlet 32, in-flow 34 of air from a cabin of an aircraft (not shown), out-flow 36 of conditioned air to the cabin, in-flow 38 of bleed air, in-flow 40 of fresh air, in-flow 41 of ram air out-flow 42 of power turbine air, out-flow 43 of ram air, and couplings 44. FIG. 2 is an enlarged perspective view of a portion of ECS pack 10. FIGS. 1 and 2 will be discussed in tandem.

ECS pack 10 is an assembly of ducts and components for controlling the pressure and temperature of air in an aircraft. Air supply manifold 12 is a manifold with various ducts. Air supply manifold 12 includes a concentric duct design (see FIGS. 3-6). In one non-limiting embodiment, air supply manifold 12 is made of high temperature aluminum, titanium or corrosion resistant steel materials, and can include a welded sheet metal, investment casting, and/or additive manufacturing construction. Fresh air heat exchanger 14, bleed air heat exchanger 16, and outflow heat exchanger 18 are heat exchangers configured to transfer thermal energy from air received by ECS pack 10.

Ram air fan inlet housing 20 is a housing that contains a ram air fan of ECS pack 10. In one non-limiting embodiment, ram air fan inlet housing 20 can contain a tip turbine fan (not shown). ACM compressor inlet 22 is an inlet of an ACM compressor. Cabin air inlet 24, fresh air inlet 26 and bleed air inlet 28 are fluid inlets of ECS pack 10. Power turbine outlet 30 and cabin air outlet 32 are fluid outlet of ECS pack 10.

In-flow 34 is an in-flow of air from a cabin of an aircraft (not shown). Out-flow 36 is an out-flow of air (e.g., conditioned air) to the cabin of the aircraft. In-flow 38 is an in-flow of bleed air into ECS pack 10. In-flow 40 is an in-flow of fresh air into ECS pack 10. In-flow 41 is an in-flow of ram air into fresh air heat exchanger 14. Out-flow 42 is an out-flow of power turbine air out of ECS pack 10. Out-flow 43 is an out-flow of ram air out of ECS pack 10. Couplings 44 are V-band clamps or couplings.

ECS pack 10 is disposed within an aircraft. In other non-limiting embodiments, ECS pack 10 is disposed in non-aircraft assemblies or applications. Air supply manifold 12 is a part of ECS pack 10. Air supply manifold 12 is fluidly connected to a source of bleed air via bleed air inlet 28, such as from a bleed system (not shown) of the aircraft. Air supply manifold 12 is fluidly connected to a source of fresh (e.g., ambient) air via fresh air inlet 26, to outflow heat exchanger 18 via a duct (see e.g., FIGS. 3-6), to a tip turbine fan (not shown) of ram air fan inlet housing 20, and to ACM compressor inlet 22.

Fresh air heat exchanger 14 is disposed within ECS pack 10 and is fluidly connected to ACM compressor inlet 22 via the ACM and to the cabin of the aircraft via additional conditioning components (e.g., to be further cooled). Bleed air heat exchanger 16 is disposed within ECS pack 10 and is fluidly connected to outflow heat exchanger 18. Outflow heat exchanger 18 is disposed within ECS pack 10 and is fluidly connected to bleed air heat exchanger 16 and to air supply manifold 12. Ram air fan inlet housing 20 is disposed within ECS pack 10 and is fluidly connected to bleed heat exchanger 16 and to air supply manifold 12. The tip turbine fan is disposed in ram air fan inlet housing 20 (not shown for clarity).

ACM compressor inlet 22 is disposed within ECS pack 10 and is fluidly connected to the ACM (not shown) of ECS pack 10 and to air supply manifold 12. Cabin air inlet 24 is fluidly connected to the cabin of the aircraft. Fresh air inlet 26 is fluidly connected to a source of fresh (e.g., ambient) air. Bleed air inlet 28 is fluidly connected to a source of bleed air, such as from a bleed system (not shown) of the aircraft. Power turbine outlet 30 is fluidly connected to a ram inlet duct (not shown) of fresh air heat exchanger 14. Cabin air outlet 32 is fluidly connected to the cabin of the aircraft.

In-flow 34 passes through cabin air inlet 24 of ECS pack 10. Out-flow 36 passes through cabin air outlet 32 of ECS pack 10 and to the cabin. In-flow 38 passes through bleed air inlet 28 and into air supply manifold 12. In-flow 40 passes through fresh air inlet 26 and into air supply manifold 12. In-flow 41 passes into fresh air heat exchanger 14. Out-flow 42 passes through power turbine outlet 30 and into the ram inlet duct (not shown) of fresh air heat exchanger 14. Out-flow 43 passes through an outlet (not shown) of ram air fan inlet housing 20 to overboard. Couplings 44 are disposed throughout ECS pack 10 at various interfaces between ducts and/or mechanical elements of ECS pack 10. Couplings 44 are clamped onto the interfaces between elements of ECS pack 10.

ECS pack 10 functions to supply conditioned air for use and consumption within the aircraft, such as to create a suitable environment for passengers within the cabin or pilot in the cockpit. The configuration of ECS pack 10 is based on the ability for ECS pack 10 to be driven by two potential sources, in-flow 38 of bleed air and in-flow 34 of cabin air. Air supply manifold 12 receives in-flow 38 of bleed air and in-flow 40 of fresh air, as well as distributes these flows to various components of ECS pack 10 such as to ACM compressor inlet 22, outflow heat exchanger 18, and to the tip turbine fan located in ram air fan inlet housing 20.

Fresh air heat exchanger 14, bleed air heat exchanger 16, and outflow heat exchanger 18 are configured to transfer thermal energy from and/or to the various air flows passing through ECS pack 10. Ram air fan inlet housing 20 is configured to use dynamic air pressure created by motion of the aircraft to increase a static air pressure within ram air fan inlet housing 20.

The ACM, of which ACM compressor inlet 22 is a part, is used to process an air source (e.g., fresh air from in-flow 40). The ACM compresses air in a compressor section which is discharged downstream to fresh air heat exchanger 14 and further routed downstream to a fresh air turbine. The turbine extracts energy from the expanded air to drive the compressor. The air output from the turbine is utilized as an air supply for the cabin of the aircraft. The ACM is used to achieve a desired pressure, temperature, and humidity in the air that is transferred to other portions of ECS pack 10 to provide conditioned air to the aircraft cabin and cockpit. ACM compressor inlet 22 supplies air from air supply manifold 12 into the compressor of the ACM.

Cabin air inlet 24 transfers in-flow 34 of air from the cabin into a duct of ECS pack 10. Fresh air inlet 26 and bleed air inlet 28 transfer in-flow 40 of fresh air and in-flow 38 of bleed air, respectively into air supply manifold 12 of ECS pack 10. Power turbine outlet 30 transfers out-flow 42 of power turbine air into the ram air inlet ducting (not shown) connected to ECS pack 10. Cabin air outlet 32 transfers out-flow 36 of air to the cabin from ECS pack 12. Couplings 44 attach via clamping onto the interfaces between the elements of ECS pack 10 so as to attach the elements to and create a seal between one another. Couplings 44 also provide proper line replaceable unit alignment of all of the elements of ECS pack 10.

A problem with existing ECS pack designs is that existing ECS packs and all their separate elements take up a significant amount of space and often use independent ducts to make the various pneumatic supply connections. As will be discussed further with respect to FIGS. 3-6, ECS pack 10 with air supply manifold 12 is designed to occupy a minimized spatial volume within the aircraft by integrating separate ducts into a single assembly offering significant spatial integration advantages over existing designs.

Figure 3:
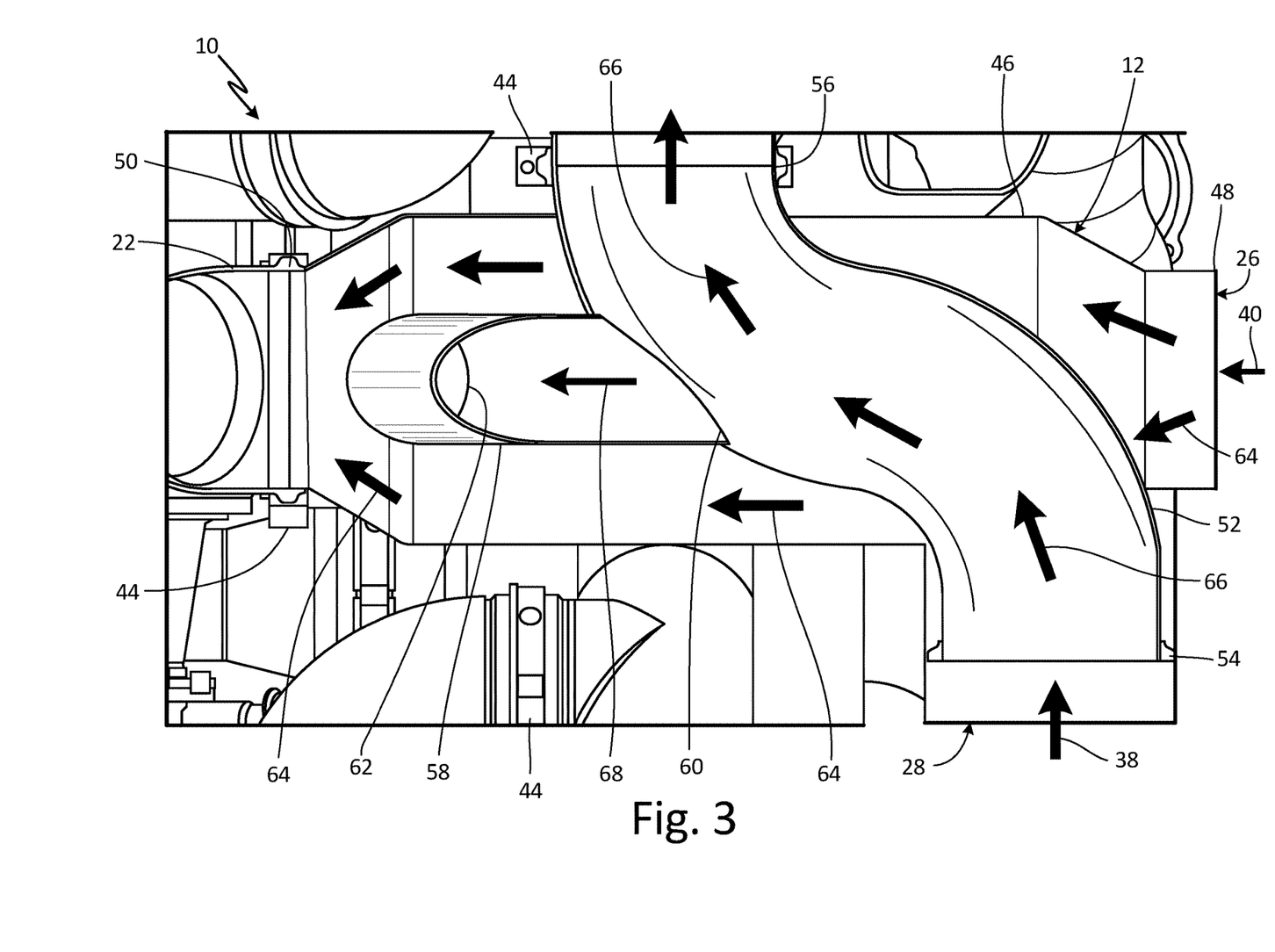
FIG. 3 is a cross-section view of the ECS pack taken along Z-Z in FIG. 2.

FIG. 3 is a cross-section view of ECS pack 10 taken along Z-Z in FIG. 2 which shows air supply manifold 12 with outer duct 46 (including outer duct inlet 48 and outer duct outlet 50), first inner duct 52 (including first inner duct inlet 54 and first inner duct outlet 56), second inner duct 58 (including second inner duct inlet 60 and second inner duct outlet 62), ACM compressor inlet 22, fresh air inlet 26, bleed air inlet 28, in-flow 38 of bleed air, in-flow 40 of fresh air, and couplings 44. FIG. 3 also shows outer flow path 64, first internal flow path 66, and second internal flow path 68.

Outer duct 46 is a tubular duct with a generally uniform circular cross-section and is configured to transfer a fluid such as air. Outer duct inlet 48 is a fluid inlet of outer duct 48. In one non-limiting embodiment, fresh air inlet 26 can include outer duct inlet 48. Outer duct outlet 50 is a fluid outlet of outer duct 48.

First inner duct 52 is a tubular duct with a generally uniform circular cross-section and is configured to transfer a fluid such as air. In one non-limiting embodiment, first inner duct 52 can include a diameter of approximately 5 inches. In another non-limiting embodiment, first inner duct 52 can include an S-shape or another shape providing a serpentine flow-path through a portion of air supply manifold 12. In other non-limiting embodiments, first inner duct 52 can pass straight across (e.g., orthogonal to) outer duct 46 or extending along a greater portion of a length of outer duct 46. First inner duct 52 can also be referred to as an internal duct.

First inner duct inlet 54 is a fluid inlet of first inner duct 52. In one non-limiting embodiment, bleed air inlet 28 can include first inner duct inlet 54. First inner duct outlet 56 is a fluid outlet of first inner duct 52. Second inner duct 58 is a generally cylindrical duct configured to transfer a fluid such as air. In one non-limiting embodiment, second inner duct 58 can include a diameter of approximately 3 inches. Second inner duct 58 can also be referred to as an internal duct. Second inner duct inlet 60 is a fluid inlet of second inner duct 58. Second inner duct outlet 62 is a fluid outlet of second inner duct 58. Outer flow path 64 is a flow path of fresh air. First internal flow path 66 is a flow path of a first portion of bleed air. Second internal flow path 68 is a flow path of a second portion of bleed air.

Outer duct 46 is fluidly connected to a source of fresh air via fresh air inlet 26 and to ACM compressor inlet 22 via outer duct outlet 50. Outer duct 46 extends between fresh air inlet 26 and outer duct outlet 50 of air supply manifold 12. Outer duct 46 defines outer flow path 64 such that outer flow path 64 passes through a portion of outer duct 46 and is configured to supply fresh air to ACM compressor inlet 22. Outer duct inlet 48 is fluidly connected to a source of fresh (e.g., ambient) air. Outer duct outlet 50 is fluidly connected to ACM compressor inlet 22. Outer duct outlet 50 is attached to ACM compressor inlet 22 with one of couplings 44.

First inner duct 52 extends from first inner duct inlet 54 to first inner duct outlet 56 and through a portion of outer duct 46. First inner duct 52 is partially disposed within and passes through outer duct 46. First inner duct 52 defines first internal flow path 66 within a portion of outer duct 46 such that first internal flow path 66 is configured to supply a portion of bleed air to outflow heat exchanger 18. First inner duct inlet 54 is disposed outside of outer duct 46 and is fluidly connected to a source of bleed air. First inner duct outlet 56 is disposed outside of outer duct 46 and is fluidly connected to outflow heat exchanger 18 (shown in FIG. 1).

Second inner duct 58 extends from second inner duct inlet 60 and second inner duct outlet 62 and through a portion of outer duct 46. Second inner duct 58 is partially disposed within and passes through outer duct 46. Second inner duct 58 intersects with and branches off of first inner duct 52 along a portion of first inner duct 52 located inside of outer duct 46. Second inner duct 58 defines second internal flow path 68 within a portion of outer duct 46 such that internal flow path 68 is configured to supply air to the tip turbine fan located in ram air fan inlet housing 20. Second inner duct inlet 60 is disposed within of outer duct 46, is attached to first inner duct 52, and is fluidly connected to first inner duct 52. Second inner duct outlet 62 is disposed outside of outer duct 46 and is fluidly connected to the tip turbine fan located in ram air fan inlet housing 20 (shown in FIG. 1).

Outer flow path 64 passes through outer duct 46 and around first inner duct 52 and second inner duct 58 such that outer flow path 64 is a separate fluid circuit from first and second internal flow paths 66 and 68. First internal flow path 66 passes through first inner duct 52. Second internal flow path 68 through second inner duct 58.

Outer duct 46 is configured to transfer a fluid (e.g., in-flow 40 of fresh air) from outer duct inlet 48, to outer duct outlet 50, and into ACM compressor inlet 22. Outer duct 46 is configured such that outer flow path 64 passes around first and second inner ducts 52 and 58. As the air in outer flow path 64 passes around and across first and second inner ducts 52 and 58, thermal energy is transferred from the bleed air in first and second inner ducts 52 and 58 to the fresh air in outer flow path 64 passing through outer duct 46.

First inner duct 52 is configured to transfer a fluid (e.g., a first portion of in-flow 38 of bleed air) from first inner duct inlet 54, to first inner duct outlet 56, and into outflow heat exchanger 18. Second inner duct 58 is configured to transfer a fluid (e.g., a second portion of in-flow 38 of bleed air) from second inner duct inlet 60, to second inner duct outlet 62, and to the tip turbine inside of ram air fan inlet housing 20.

Outer flow path 64 passes cool fresh air across first and second inner ducts 52 and 58 such that thermal energy is transferred from first and second inner ducts 52 and 58 to the fresh air of outer flow path 64. The fresh air of outer flow path 64 then passes into the compressor of the ACM via ACM compressor inlet 22 to drive the compressor of the ACM. First internal flow path 66 passes a portion of warm bleed air through first inner duct 52 such that thermal energy is transferred from the bleed air in first internal flow path 66 to the fresh air of the outer flow path 64. Second internal flow path 68 passes another portion of warm bleed air through second inner duct 58 such that thermal energy is transferred from the bleed air in second internal flow path 68 to the fresh air of the outer flow path 64.

Instead of outer duct 46, first inner duct 52, and second inner duct 58 occupying separate and discrete spaces within ECS pack 10 (as would be the case in existing ECS pack configurations), the configuration of air supply manifold 12 with first and second inner ducts 52 and 58 passing through a portion of outer duct 46 reduces the amount of volume necessary for each of the three elements as well as provides additional thermal energy transfer capabilities as between outer duct 46, first inner duct 52, and second inner duct 58. The efficient configuring approach of air supply manifold 12 reduces the over-all volume of ECS pack 10 by enabling ECS pack 10 to fit within the same dimensional envelopes of existing (e.g., lower capacity chilled recirculating) ECS packs.

Figure 4:
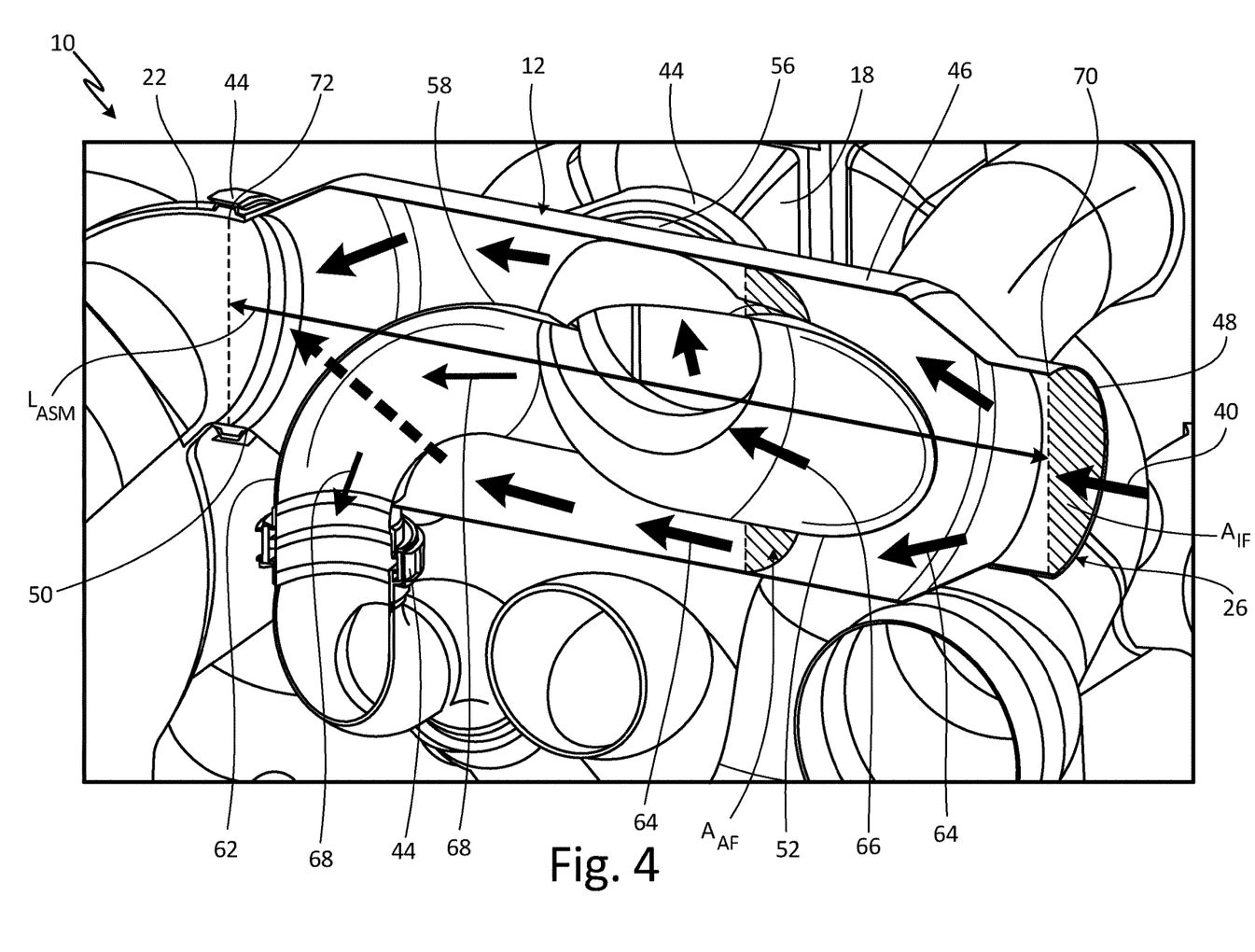
FIG. 4 is a cross-section view of the ECS pack taken along Y-Y in FIG. 2, in which the air supply manifold is shown without vanes.

FIG. 4 is a cross-section view of ECS pack 10 taken along Y-Y in FIG. 2 which, in addition to the elements discussed with FIGS. 1-3, shows length $L_{ASM}$ of air supply manifold 12, annular flow area $A_{AF}$ of air supply manifold 12, inlet flow area $A_{IF}$ of outer duct inlet 48, outer distal edge 70 of outer duct inlet 48, and outer distal edge 72 of outer duct outlet 50.

Length $L_{ASM}$ is a length of air supply manifold 12 extending from outer distal edge 70 of outer duct inlet 48 to outer distal edge 72 of outer duct outlet 50. In one non-limiting embodiment, length $L_{ASM}$ of air supply manifold 12 is approximately 16 inches. Annular flow area $A_{AF}$ is an area of flow at any given axial location of air supply manifold 12 along length $L_{ASM}$ of air supply manifold 12. At any given axial location along air supply manifold 12, annular flow area $A_{AF}$ is equivalent to a cross-sectional area of outer duct 46 (with the cross-section taken perpendicular to a general direction of flow through outer duct 46) minus the sum of the cross-sectional areas of first inner duct 52 and second inner duct 58 taken at the same point as the cross-sectional area taken for outer duct 46. As shown in FIGS. 3 and 4, outer flow path 64 through outer duct 46 occupies annular flow area $A_{AF}$ along length $L_{ASM}$ of air supply manifold 12. Inlet flow area $A_{IF}$ is an area of flow of outer duct inlet 48.

In one non-limiting embodiment, annular flow area $A_{AF}$ along length $L_{ASM}$ of air supply manifold 12 is greater than or equal to inlet flow area $A_{IF}$ of outer duct inlet 48. With annular flow area $A_{AF}$ along length $L_{ASM}$ of air supply manifold 12 being greater than or equal to inlet flow area $A_{IF}$ of outer duct inlet 48, pressure drop losses throughout a fresh air circuit of ECS pack 10 (e.g., outer duct 46 and the ACM) are reduced.

Reducing the pressure drop losses throughout the fresh air circuit of ECS pack 10 results in an increase in efficiency of ECS pack 10 because less energy is needed to account for the pressure drop losses than are present in existing ECS packs without the configuration of air supply manifold 12 and spatial relationship of length $L_{ASM}$ of air supply manifold 12, annular flow area $A_{AF}$ of air supply manifold 12, and inlet flow area $A_{IF}$ of outer duct inlet 48.

Figure 5:
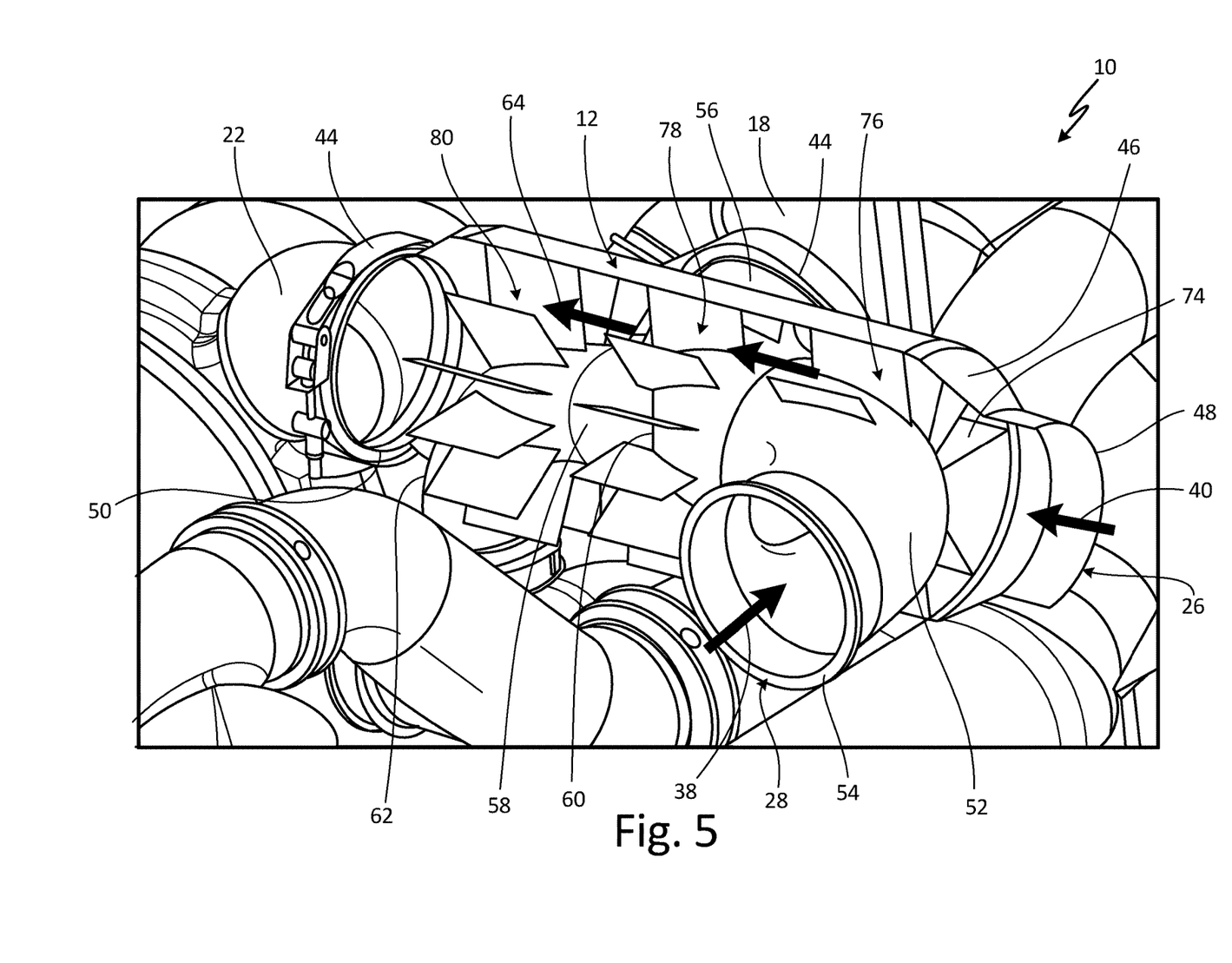
FIG. 5 is a cross-section view of the ECS pack taken along Y-Y in FIG. 2, in which some elements of the air supply manifold are shown in full perspective view.

FIG. 5 is another cross-section view of ECS pack 10 taken along Y-Y in FIG. 2, which, in addition to the elements discussed with FIGS. 1-4, shows air supply manifold 12 with vanes 74, first set 76 of vanes 74, second set 78 of vanes 74, and third set 80 of vanes 74.

Vanes 74 are fins, vanes, or airfoils. In one non-limiting embodiment, vanes 74 can include flat pieces of metal such as aluminum, steel, or titanium. In other non-limiting embodiments, vanes 74 can include non-flat profiles such as spiral, slanted, jagged, angled, or another non-flat configuration. First set 76, second set 78, and third set 80 of vanes 74 are first, second, and third sets of vanes 74, respectively. In one non-limiting embodiment, air supply manifold 12 can include three sets of vanes 74. In other non-limiting embodiments, air supply manifold can include more or less than three sets of vanes 74.

In one non-limiting embodiment, vanes 74 extend from either first inner duct 52 or second inner duct 58 outward to outer duct 46 such that vanes 74 come are in contact with either first inner duct 52 or second inner duct 58 and outer duct 46. In other non-limiting embodiments, a portion or all of vanes 74 can extend partially between either first inner duct 52 or second inner duct 58 outward to outer duct 46. In yet another non-limiting embodiment, vanes 74 can instead be attached to extend radially inward from outer duct 46. Vanes 74 are welded to either first inner duct 52 or second inner duct 58 and to outer duct 46. In other non-limiting embodiments, vanes 74 can be otherwise mechanically attached or fastened to first inner duct 52, second inner duct 58, and/or outer duct 46. In other non-limiting embodiments, vanes 74 is disposed in at least one of first and second inner ducts 52 and 58 as well as in other portions of air supply manifold 12 such as fresh air inlet 26, bleed air inlet 28, outer duct inlet 48, outer duct outlet 50, first inner duct inlet 54, first inner duct outlet 56, second inner duct inlet 60, and/or second inner duct outlet 62.

In FIG. 5, first set 76 of vanes 74 is attached to and extends radially outward from first inner duct 52. Second set 78 of vanes 74 is attached to and extends radially outward from a portion of first inner duct 52 and from a portion of second inner duct 58. In another non-limiting embodiment, second set of vanes 74 is attached to and extend from either first inner duct 52 or second inner duct 58. Third set 80 of vanes 74 is attached to and extends radially outward from second inner duct 58. In one non-limiting embodiment, an axial length of each of vanes 74 is uniform for all vanes 74, or is varied depending on desired flow and thermal behavior characteristic of air supply manifold 12 as determined, for example by a computational flow dynamics analysis.

Vanes 74 provide structural support for first inner duct 52 and second inner duct 58 within outer duct 46 by preventing relative motion between outer duct 46 and at least one of first inner duct 52 and second inner duct 58. Vanes 74 offer the potential for thermal energy transfer between first and second internal flow paths 66 and 68 and outer flow path 64. Thermal heat transfer from the bleed air in first and second internal flow paths 66 and 68 to outer flow path 64 would preheat the air of outer flow path 64 before entering the compressor of the ACM. Vanes 74 also are configured to straighten outer flow path 64 passing across vanes 74.

The provided structural support of vanes 74 prevents first and second inner ducts 52 and 58 from bouncing or clanking around relative to outer duct 46 which could damage the elements of air supply manifold. With vanes 74 straightening the air flow of outer flow path 64, pressure drop losses are further reduced throughout the fresh air circuit of ECS pack 10 resulting in an increase in overall efficiency of ECS pack 10.

Figure 6:
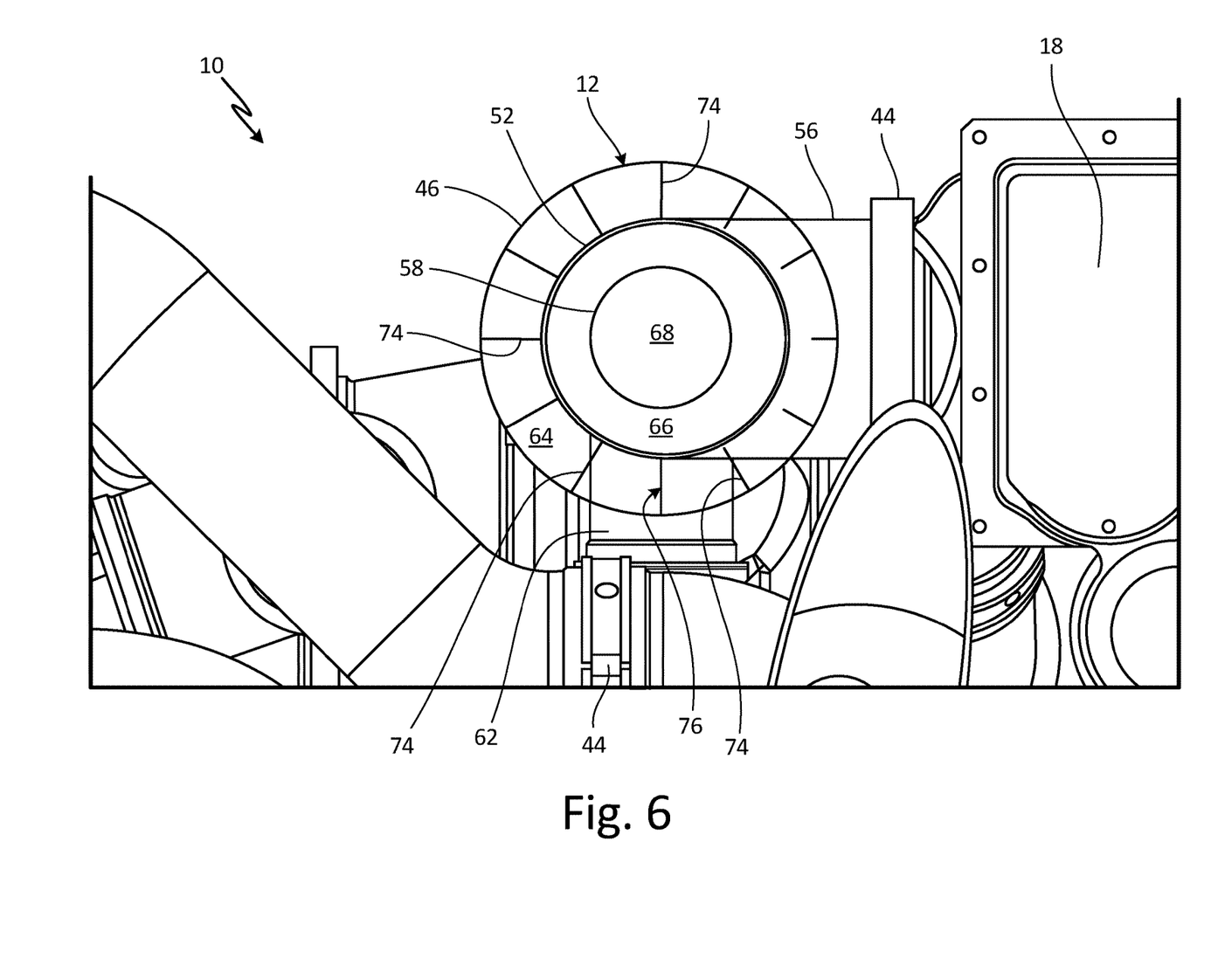
FIG. 6 is a cross-section view of the ECS pack taken along X-X in FIG. 2.

FIG. 6 is a cross-section view of ECS pack 10 taken along X-X in FIG. 2, which shows a portion of ECS pack 10, air supply manifold 12, outflow heat exchanger 18, couplings 44, outer duct 46, first inner duct 52, first inner duct outlet 56, second inner duct 58, second inner duct outlet 62, outer flow path 64, first internal flow path 66, second internal flow path 68, and first set 76 of vanes 74.

In one non-limiting embodiment, outer duct 46, first inner duct 52, and second inner duct 58 include circular cross-section shapes. In other non-limiting embodiments, outer duct 46, first inner duct 52, and/or second inner duct 58 can include non-circular cross-section shapes such as curved or polygonal shapes. Portions of outer duct 46, first inner duct 52, and second inner duct 58 (e.g., portions shown in cross-section in FIG. 6) are disposed concentrically with one another. In other non-limiting embodiments, outer duct 46, first inner duct 52, and/or second inner duct 58 is disposed non-concentrically relative to one another.

As shown in FIGS. 5 and 6, vanes 74 are circumferentially clocked such that there is even spacing between successive vanes. In one non-limiting embodiment, vanes 74 can include a non-uniform circumferential spacing pattern between successive vanes. First set 76 of vanes 74 includes twelve vanes. In other non-limiting embodiments, first set 76, second set 78, and/or third set 80 of vanes 74 can include an even or odd amount of vanes as well as more or less than twelve vanes.

The circumferential clocking and quantity of vanes 74 in each of first, second, and third sets 76, 78, and 80 is dependent on the thermal transfer characteristics of vanes 74 and how much thermal energy transfer is desired between the bleed air of first and second internal flow paths 66 and 68 and the fresh air of outer flow path 64.

As discussed with respect to FIG. 5, vanes 74 provide structural support for first and second inner ducts 52 and 58, thermal energy transfer from first and second internal flow paths 66 and 68 to outer flow path 64, and flow straightening of outer flow path 64. Air supply manifold integrates these three functions into a single assembly offering significant spatial integration advantages over existing ECS packs. This efficient packaging approach reduces the over-all volume of ECS pack 10 enabling ECS pack 10 to fit within the same dimensional envelopes of existing (e.g., lower capacity chilled recirculating) ECS packs.

Discussion of Possible Embodiments

The following are non-exclusive descriptions of possible embodiments of the present invention.

An air supply manifold includes an outer duct, a first inner duct, and a second inner duct. The outer duct is configured to transfer a fluid from the outer duct inlet to the outer duct outlet and includes an outer duct inlet and an outer duct outlet. The first inner duct is disposed within and passes through the outer duct and includes a first inner duct inlet and a first inner duct outlet. The second inner duct includes a second inner duct outlet and a second inner duct inlet fluidly connected to the first inner duct. The second inner duct is disposed within the outer duct and branches off from the first inner duct. The second inner duct outlet is disposed outside of the outer duct.

The air supply manifold of the preceding paragraph can optionally include, additionally and/or alternatively, any one or more of the following features, configurations and/or additional components.

A set of vanes can be connected to and/or extend outward from at least one of the first inner duct and the second inner duct.

Each vane of the set of vanes can extend from the at least one of the first inner duct and the second inner duct and/or can come into contact with the outer duct.

Each vane of the set of vanes can be configured to transfer thermal energy from the at least one of the first inner duct and the second inner duct to a flow of fluid passing across the set of vanes.

The set of vanes can be configured to structurally support the at least one of the first inner duct and the second inner duct by preventing relative motion between the outer duct and the at least one of the first inner duct and the second inner duct.

The set of vanes can be configured to straighten a flow of fluid passing across the set of vanes.

The outer duct inlet can comprise an inlet flow area, wherein the air supply manifold can comprise a length extending from the outer duct inlet to an outer duct outlet and/or an annular flow area between the outer duct and the at least one of the first inner duct and the second inner duct, wherein along the length of the air supply manifold the annular flow area of the air supply manifold can be greater than or equal to the inlet flow area of the outer duct inlet.

A material of the air supply manifold can comprise aluminum, steel, or titanium.

The air supply manifold can comprises at least one of a welded sheet metal, investment casting, and/or additive manufacturing construction.

The second inner duct inlet can be disposed within the outer duct.

An environmental control system pack includes an air supply manifold, an outflow heat exchanger, an air cycle machine compressor inlet, a tip turbine fan, a bleed air source, and a fresh air source. The air supply manifold includes an outer duct, a first inner duct, a second inner duct, and a set of support vanes. The outer duct is configured to transfer a fluid from the outer duct inlet to the outer duct outlet and includes an outer duct inlet and an outer duct outlet. The first inner duct is disposed within the outer duct and includes a first inner duct inlet and a first inner duct outlet. The second inner duct includes a second inner duct outlet and a second inner duct inlet fluidly connected to the first inner duct. The second inner duct is disposed within the outer duct and branches off from the first inner duct. The set of support vanes is connected to and extends outward from at least one of the first inner duct and the second inner duct. The outflow heat exchanger is fluidly connected to the first inner duct outlet. The air cycle machine compressor inlet is fluidly connected to the outer duct outlet. The tip turbine fan is fluidly connected to the second inner duct outlet. The bleed air source is fluidly connected to the first inner duct inlet. The fresh air source is fluidly connected to the outer duct inlet.

The environmental control system pack of the preceding paragraph can optionally include, additionally and/or alternatively, any one or more of the following features, configurations and/or additional components.

Each vane of the set of vanes can extend from the at least one of the first inner duct and the second inner duct and/or can come into contact with the outer duct.

Each vane of the set of vanes can be configured to transfer thermal energy from the at least one of the first inner duct and the second inner duct to a flow of fluid passing across the set of vanes.

The set of vanes can be configured to structurally support the at least one of the first inner duct and the second inner duct by preventing relative motion between the outer duct and the at least one of the first inner duct and the second inner duct.

The set of vanes can be configured to straighten a flow of fluid passing across the set of vanes.

The outer duct inlet can comprise an inlet flow area, wherein the air supply manifold can comprise a length extending from the outer duct inlet to an outer duct outlet and/or an annular flow area between the outer duct and the at least one of the first inner duct and the second inner duct, wherein along the length of the air supply manifold the annular flow area of the air supply manifold can be greater than or equal to the inlet flow area of the outer duct inlet.

The first inner duct inlet and the first inner duct outlet can be disposed outside of the outer duct, the second inner duct inlet can be disposed within the outer duct, and/or the second inner duct outlet can be disposed outside of the outer duct.

The environmental control system pack can comprise at least one of a welded sheet metal, investment casting, and/or additive manufacturing construction and/or a material of the air supply manifold can comprise aluminum, steel, or titanium.

A first inner flow path can be defined by the first inner duct, wherein the first inner flow path can be fluidly connected to the bleed air source and to the outflow heat exchanger; a second inner flow path can be defined by the second inner duct, wherein the second inner flow path can be fluidly connected to the first inner duct and to the tip turbine fan; and an outer flow path can be defined by the outer duct, wherein the outer flow path can be fluidly connected to the fresh air source and to the air cycle machine compressor inlet.

An environmental control system pack includes an outflow heat exchanger, an air cycle machine compressor inlet, a tip turbine fan, a bleed air source, a fresh air source, and an air supply manifold. The air supply manifold includes an outer duct, a first internal duct, and a second internal duct. The outer duct includes an outer duct outlet and a fresh air inlet fluidly connected to the fresh air source. The outer duct defines an outer flow path configured to supply fresh air to the air cycle machine compressor inlet. The first internal duct includes a first internal duct outlet and a first internal duct inlet fluidly connected to the bleed air source. The first internal duct is disposed within the outer duct. The first internal duct outlet defines a first internal flow path configured to supply air to the outflow heat exchanger. The first internal duct inlet and the first internal duct outlet are disposed outside of the outer duct. The second internal duct includes a second internal duct outlet and a second internal duct inlet fluidly connected to the first internal duct. The second internal duct is disposed within the outer duct and branches off from the first internal duct. The second internal duct defines a second internal flow path configured to supply air to the tip turbine fan. The second inner duct inlet is disposed within the outer duct and the second inner duct outlet is disposed outside of the outer duct.

The environmental control system pack of the preceding paragraph can optionally include, additionally and/or alternatively, any one or more of the following features, configurations and/or additional components.

A set of support vanes can be connected to and can extend outward from at least one of the first internal duct and the second internal duct, wherein the set of vanes can be configured to structurally support the at least one of the first internal duct and the second internal duct by preventing relative motion between the outer duct and the at least one of the first internal duct and the second internal duct.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air supply manifold comprising:
an outer duct with an outer duct inlet and an outer duct outlet, wherein the outer duct is configured to transfer a fluid from the outer duct inlet to the outer duct outlet;
a first inner duct with a first inner duct inlet and a first inner duct outlet, wherein the first inner duct is partially disposed within and passes through the outer duct, wherein the first inner duct inlet and the first inner duct outlet are disposed outside of the outer duct; and
a second inner duct with a second inner duct inlet and a second inner duct outlet, wherein the second inner duct is partially disposed within the outer duct and branches off from the first inner duct at a location inside of the outer duct, wherein the second inner duct inlet connects to the first inner duct at a location inside of the outer duct, and wherein the second inner duct outlet is disposed outside of the outer duct, wherein a portion of the outer duct, a portion of the first inner duct, and a portion of the second inner duct are disposed concentrically with each other.

2. The air supply manifold of claim 1 and further comprising a set of vanes connected to and extending outward from at least one of the first inner duct and the second inner duct.

3. The air supply manifold of claim 2, wherein each vane of the set of vanes extends from the at least one of the first inner duct and the second inner duct and comes into contact with the outer duct.

4. The air supply manifold of claim 2, wherein each vane of the set of vanes is configured to transfer thermal energy from the at least one of the first inner duct and the second inner duct to a flow of fluid passing across the set of vanes.

5. The air supply manifold of claim 2, wherein the set of vanes is configured to structurally support the at least one of the first inner duct and the second inner duct by preventing relative motion between the outer duct and the at least one of the first inner duct and the second inner duct.

6. The air supply manifold of claim 2, wherein the set of vanes is configured to straighten a flow of fluid passing across the set of vanes.

7. The air supply manifold of claim 1, wherein the outer duct inlet comprises an inlet flow area, wherein the air supply manifold comprises a length extending from the outer duct inlet to the outer duct outlet and an annular flow area between the outer duct and the at least one of the first inner duct and the second inner duct, wherein along the length of the air supply manifold the annular flow area of the air supply manifold is greater than or equal to the inlet flow area of the outer duct inlet.

8. The air supply manifold of claim 1, wherein a material of the air supply manifold comprises aluminum, steel, or titanium.

9. The air supply manifold of claim 1 further comprising at least one of a welded sheet metal, investment casting, and additive manufacturing construction.

10. The air supply manifold of claim 1, wherein the second inner duct inlet is disposed within the outer duct.

11. An environmental control system pack comprising:
an air supply manifold comprising:
an outer duct with an outer duct inlet and an outer duct outlet, wherein the outer duct is configured to transfer a fluid from the outer duct inlet to the outer duct outlet;
a first inner duct with a first inner duct inlet and a first inner duct outlet, wherein the first inner duct is disposed within the outer duct;

a second inner duct with a second inner duct inlet and a second inner duct outlet, wherein the second inner duct is disposed within the outer duct and branches off from the first inner duct at a location inside of the outer duct, wherein the second inner duct inlet connects to the first inner duct at a location inside of the outer duct, wherein a portion of the outer duct, a portion of the first inner duct, and a portion of the second inner duct are disposed concentrically with each other; and a set of support vanes connected to and extending outward from at least one of the first inner duct and the second inner duct;

an outflow heat exchanger fluidly connected to the first inner duct outlet;

an air cycle machine compressor inlet fluidly connected to the outer duct outlet;

a tip turbine fan fluidly connected to the second inner duct outlet;

a bleed air source fluidly connected to the first inner duct inlet; and a fresh air source fluidly connected to the outer duct inlet.

12. The environmental control system pack of claim 11, wherein each vane of the set of vanes extends from the at least one of the first inner duct and the second inner duct and comes into contact with the outer duct.

13. The environmental control system pack of claim 11, wherein each vane of the set of vanes is configured to transfer thermal energy from the at least one of the first inner duct and the second inner duct to a flow of fluid passing across the set of vanes.

14. The environmental control system pack of claim 11, wherein the set of vanes is configured to structurally support the at least one of the first inner duct and the second inner duct by preventing relative motion between the outer duct and the at least one of the first inner duct and the second inner duct.

15. The environmental control system pack of claim 11, wherein the set of vanes is configured to straighten a flow of fluid passing across the set of vanes.

16. The environmental control system pack of claim 11, wherein the outer duct inlet comprises an inlet flow area, wherein the air supply manifold comprises a length extending from the outer duct inlet to an outer duct outlet and an annular flow area between the outer duct and the at least one of the first inner duct and the second inner duct, wherein along the length of the air supply manifold the annular flow area of the air supply manifold is greater than or equal to the inlet flow area of the outer duct inlet.

17. The environmental control system pack of claim 11, wherein the first inner duct inlet and the first inner duct outlet are disposed outside of the outer duct, the second inner duct inlet is disposed within the outer duct, and the second inner duct outlet is disposed outside of the outer duct.

18. The environmental control system pack of claim 11 further comprising at least one of a welded sheet metal, investment casting, and additive manufacturing construction, wherein a material of the air supply manifold comprises aluminum, steel, or titanium.

19. The environmental control system pack of claim 11 further comprising:

a first inner flow path defined by the first inner duct, wherein the first inner flow path is fluidly connected to the bleed air source and to the outflow heat exchanger;

a second inner flow path defined by the second inner duct, wherein the second inner flow path is fluidly connected to the first inner duct and to the tip turbine fan; and an outer flow path defined by the outer duct, wherein the outer flow path is fluidly connected to the fresh air source and to the air cycle machine compressor inlet.

20. An environmental control system pack comprising:

an outflow heat exchanger;

an air cycle machine compressor inlet;

a tip turbine fan;

a bleed air source;

a fresh air source; and an air supply manifold comprising:

an outer duct with an outer duct outlet and a fresh air inlet fluidly connected to the fresh air source, wherein the outer duct defines an outer flow path configured to supply fresh air to the air cycle machine compressor inlet;

a first internal duct with a first internal duct outlet and a first internal duct inlet fluidly connected to the bleed air source, wherein the first internal duct is partially disposed within the outer duct, wherein the first internal duct outlet defines a first internal flow path configured to supply air to the outflow heat exchanger, wherein the first internal duct inlet and the first internal duct outlet are disposed outside of the outer duct; and a second internal duct with a second internal duct outlet and a second internal duct inlet fluidly connected to the first internal duct, wherein the second internal duct is partially disposed within the outer duct and branches off from the first internal duct at a location inside of the outer duct, wherein the second internal duct defines a second internal flow path configured to supply air to the tip turbine fan, wherein the second inner duct inlet is disposed within the outer duct and the second inner duct outlet is disposed outside of the outer duct, wherein a portion of the outer duct, a portion of the first internal duct, and a portion of the second internal duct are disposed concentrically with each other.

21. The environmental control system pack of claim 20 further comprising:

a set of support vanes connected to and extending outward from at least one of the first internal duct and the second internal duct, wherein the set of vanes is configured to structurally support the at least one of the first internal duct and the second internal duct by preventing relative motion between the outer duct and the at least one of the first internal duct and the second internal duct.

* * * * *